(12) United States Patent
Lacey, II

(10) Patent No.: US 10,046,996 B1
(45) Date of Patent: Aug. 14, 2018

(54) MULTI-STAGE RESIDENTIAL WASTEWATER TREATMENT TANK AND BACTERICIDE PUMP

(71) Applicant: Joe W. Lacey, II, Flowood, MS (US)

(72) Inventor: Joe W. Lacey, II, Flowood, MS (US)

( * ) Notice: Subject to any disclaimer, the term of this patent is extended or adjusted under 35 U.S.C. 154(b) by 52 days.

(21) Appl. No.: 15/069,383

(22) Filed: Mar. 14, 2016

(51) Int. Cl.
| C02F 3/02 | (2006.01) |
| C02F 3/00 | (2006.01) |
| C02F 3/28 | (2006.01) |

(52) U.S. Cl.
CPC .............. *C02F 3/006* (2013.01); *C02F 3/02* (2013.01); *C02F 3/28* (2013.01); *C02F 2209/40* (2013.01); *C02F 2209/42* (2013.01)

(58) Field of Classification Search
None
See application file for complete search history.

(56) References Cited

U.S. PATENT DOCUMENTS

| 3,320,621 | A | * | 5/1967 | Vita | .......................... | B63J 4/004 |
| | | | | | | 210/631 |
| 4,664,795 | A | * | 5/1987 | Stegall | .................. | C02F 3/1242 |
| | | | | | | 210/202 |
| 6,627,071 | B1 | | 9/2003 | Braden | | |
| 6,932,912 | B2 | | 8/2005 | Chaffin | | |
| 7,186,330 | B2 | | 3/2007 | McKinney | | |
| 7,314,546 | B2 | | 1/2008 | McKinney | | |
| 7,651,607 | B2 | | 1/2010 | Braden | | |
| 7,837,867 | B2 | | 11/2010 | McKinney | | |
| 7,874,462 | B2 | | 1/2011 | Yandell | | |
| 7,875,170 | B2 | | 1/2011 | McKinney | | |
| 7,879,230 | B2 | | 2/2011 | Yandell | | |
| 7,892,422 | B2 | | 2/2011 | Chaffin | | |
| 8,038,874 | B2 | | 10/2011 | McKinney | | |
| 8,192,616 | B2 | | 6/2012 | Chaffin | | |
| 2007/0259416 | A1 | * | 11/2007 | Parker | .................... | B01D 53/84 |
| | | | | | | 435/266 |
| 2010/0326904 | A1 | * | 12/2010 | Lord | ....................... | C02F 1/687 |
| | | | | | | 210/605 |

* cited by examiner

*Primary Examiner* — Chester T Barry
(74) *Attorney, Agent, or Firm* — Roy Kiesel Ford Doody & Thurmon APLC

(57) ABSTRACT

A multistage residential wastewater treatment system. The preferred system has three chambers. Wastewater flows into the first chamber via an inflow line. Primarily anaerobic treatment occurs in the first chamber. From the first chamber, wastewater flows into a second chamber. The second chamber is aerated, and primarily aerobic treatment occurs there. Substantially fully treated wastewater flows from the second chamber to the third chamber. The third chamber is substantially quiescent and anaerobic. Most remaining solids settle out in the third chamber. A bactericide pump is configured to introduce batch doses of bactericide in the desired volume to the third chamber at set intervals. After sufficient delay following introduction of the bactericide to allow for substantially complete toxicity to the bacteria in third chamber, effluent is pumped out of the tank by an effluent pump via an effluent line. The effluent pump preferably powers the bactericide pump.

30 Claims, 3 Drawing Sheets

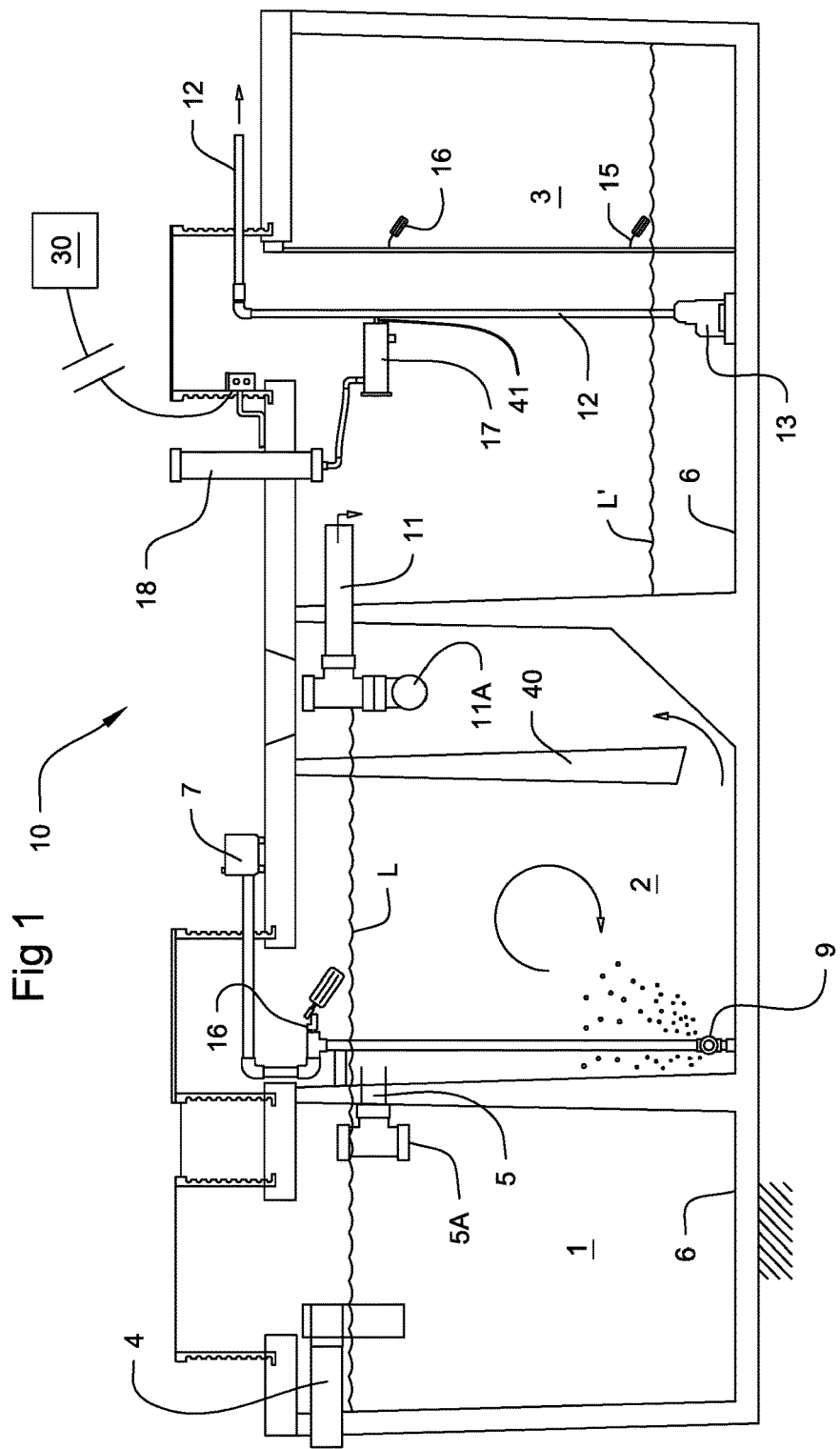

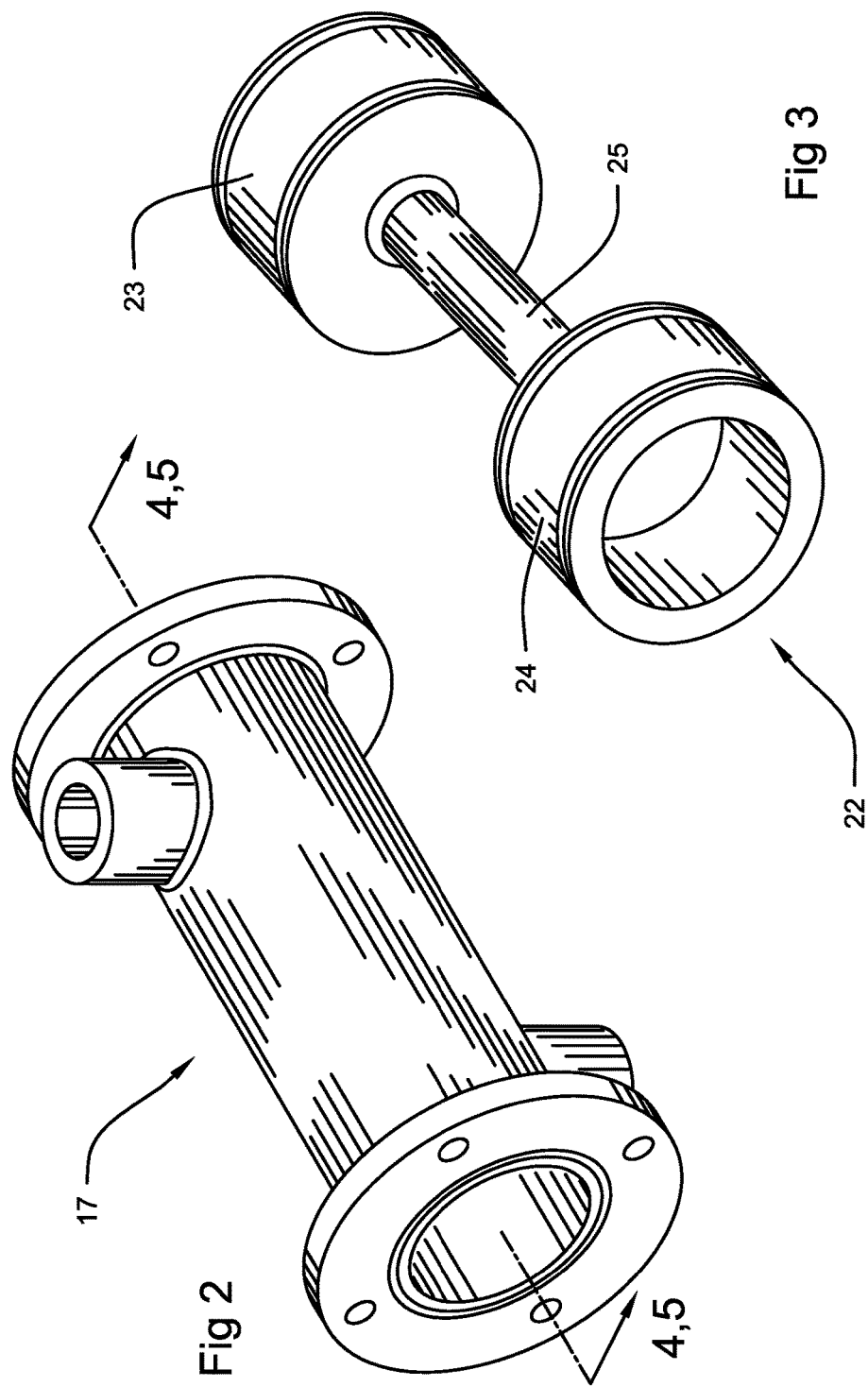

MULTI-STAGE RESIDENTIAL WASTEWATER TREATMENT TANK AND BACTERICIDE PUMP

BACKGROUND OF THE INVENTION

Field of the Invention

The invention pertains to wastewater treatment in general and the introduction a bactericide to treated wastewater in particular.

Prior Art

Multistage treatment of wastewater is known in the prior art. In residential wastewater treatment, the resulting effluent will frequently contain substantial amounts of bacteria whose presence can cause physical problems in the form of slime, mats and clogging. Some of the bacteria present in residential treatment system can also be pathogenic. Use of bactericide to kill the microbes in the wastewater is known. However, introduction of bactericide into a wastewater treatment system must be carefully controlled, as bacteria play a fundamental role in treating most of the contaminants in wastewater. Introduction of bactericide to a wastewater treatment system in portions of the system other than the effluent can substantially adversely affect the system. For residential wastewater systems, this is a significant problem. The homeowner cannot simply add a bactericide to the system the way most items are added. Flushing a concentrated chlorine solution down the toilet will have a catastrophic affect on the system, and is potentially dangerous. Additionally, the homeowner frequently lacks the expertise to add a bactericide to a residential treatment system in the right amounts or at the correct time. If insufficient bactericide is added, the desired results will not be achieved—i.e., the microbes will not be killed. Similar negative results occur if the bactericide is not added at the right time. Therefore, a residential wastewater treatment system meeting the following objectives is desired

OBJECTS OF THE INVENTION

It is an object of the invention to provide a residential wastewater treatment system that will substantially reduce or eliminate the discharge of live bacteria with the effluent.

It is another object of the invention to provide a residential wastewater treatment system that will automatically introduce a bactericide into the system.

It is yet another object of the invention to provide a residential wastewater treatment system that will introduce a bactericide only into those stages of the system where live bacteria are no longer needed.

It is still another object of the invention to provide a residential wastewater treatment system that will introduce bactericide in predetermined, batch (i.e., not continuous) quantities.

It is yet another object of the invention to provide a residential wastewater treatment system that will introduce bactericide with minimal amounts of user interaction.

It is still another object of the invention to provide a wastewater treatment system that will conserve the amount of bactericide used.

SUMMARY OF THE INVENTION

A multistage residential wastewater treatment system is disclosed. In the preferred embodiment, the system has three chambers. Wastewater flows into the first chamber via an inflow line. Primarily anaerobic treatment will occur in the first chamber. From the first chamber, wastewater will flow into a second chamber. The second chamber is aerated, and primarily aerobic treatment will occur there. Substantially fully treated wastewater will flow from the second chamber to the third chamber. The third chamber is substantially quiescent and anaerobic. Most remaining solids will settle out in the third chamber. A bactericide pump is configured to introduce batch doses of bactericide in the desired volume to the third chamber at set intervals. After sufficient delay following introduction of the bactericide to allow for substantially complete toxicity to the bacteria in third chamber, effluent is pumped out of tank by an effluent pump via an effluent line. In the preferred embodiment, the effluent pump drives the bactericide pump. Treated wastewater may be returned to ground water, surface waters, or reused for irrigation or the like according to local regulations and user objectives.

BRIEF DESCRIPTION OF THE DRAWINGS

FIG. 1 is a side cut-away view of a preferred embodiment of a multi-stage residential wastewater treatment system.

FIG. 2 is a perspective view of a preferred embodiment of a bactericide pump.

FIG. 3 is a perspective view of a preferred embodiment of a piston for a bactericide pump

DETAILED DESCRIPTION OF THE PREFERRED EMBODIMENT

Figure 4:
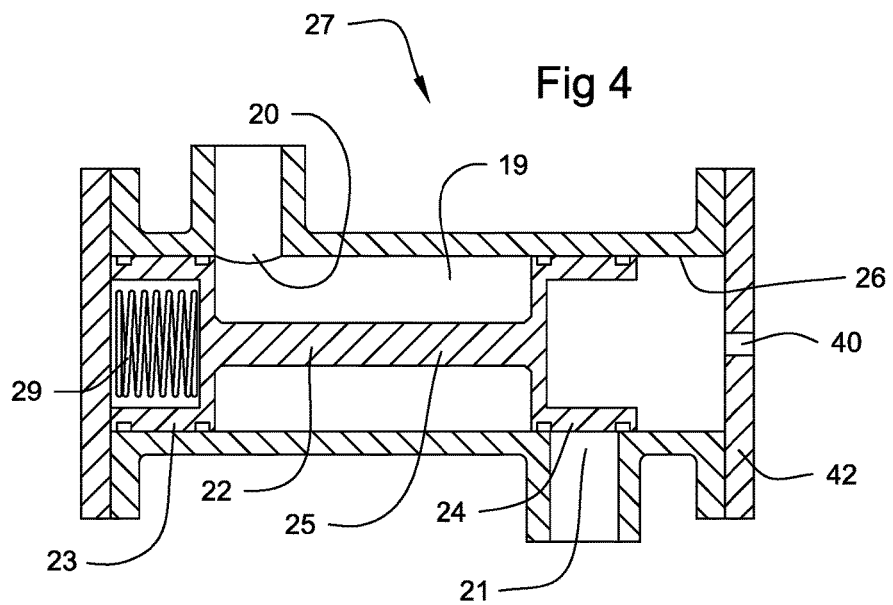
FIG. 4 is a cut-away side view of a preferred embodiment of a bactericide pump in the closed position.
Figure 5:
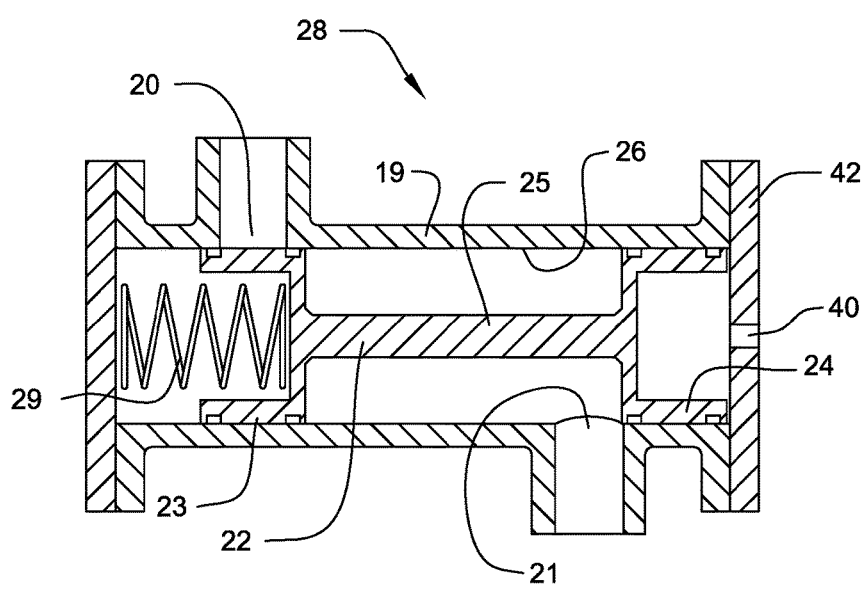
FIG. 5 is a cut-away side view of a preferred embodiment of a bactericide pump in the open position.

The invention comprises a multi-chamber wastewater treatment tank 10. The preferred embodiment comprises at least three sequential chambers: a first substantially anaerobic chamber 1; a second aerobic chamber 2; and a third substantially anaerobic settling chamber 3. The size of chambers 1, 2, 3 will depend upon the daily volume of water tank 10 is designed to treat.

Tank 10 may be made of plastic, steel or any conventional material. In the preferred embodiment, tank 10 is made of precast concrete.

Wastewater will enter treatment tank 10 via an inflow line 4 that empties into first chamber 1. Wastewater entering tank 10 can be expected to have relatively high dissolved oxygen levels. Water will be oxygenated via the action taken on it within a household: running shower; flushing toilet; churning washing machine; etc.

However, water in first chamber 1 will be relatively quiescent for long periods of time, during which the oxygen content in first chamber 1 will fall steadily as oxygen is consumed. Thus, on average, conditions in first chamber 1 will be substantially anaerobic, though punctuated with periods in which water with a relatively high oxygen concentration is introduced.

Wastewater in first chamber 1 will also be substantially raw. The carbon available to be metabolized (measured in terms of Biological Oxygen Demand or BOD) will be highest in first chamber 1. Similarly, wastewater will enter first chamber 1 with its maximum levels of organic nitrogen—e.g., urea.

The environment in first chamber 1 will tend to favor anaerobic bacteria. As a result, anaerobic bacteria will tend to predominate there. Many anaerobic bacteria will readily convert organic nitrogen to ammonia (NH3) and ammonium (NH4).

Second chamber 2 is fluidly connected to first chamber 1. First chamber 1 and second chamber 2 will preferably have a common fluid level L. A first pipe 5 will connect first chamber 1 and second chamber 2. Water will preferably flow between first chamber 1 and second chamber 2 via gravity. However, first pipe 5, or at least mouth 5A of first pipe 5 is preferably positioned below fluid level L, but well above bottom 6 of tank 10. Any debris or other solids floating on the surface will not be able to enter second chamber 2 because mouth 5A to first pipe 5 is positioned well below the location of any floating solids. This will help prevent first pipe 5 from becoming clogged and help retain larger solids in first chamber 1 for anaerobic treatment.

Second chamber 2 is preferably aerated, either continuously, at predetermined intervals, or as needed if a dissolved oxygen meter is provided. Tank 10 is preferably provided with an aerator 7 configured to pump compressed air into second tank 2 via an aeration line 8 and a diffuser 9 preferably positioned proximate bottom 6. The aeration will create an aerobic environment in second chamber 2, allowing aerobic bacteria to predominate there. The aerobic bacteria will rapidly reduce the BOD levels in second chamber 2. However, because of the high dissolved oxygen content, any facultative anaerobes that may be present will be metabolizing carbon aerobically. As a result, little denitrification will occur in second chamber 2. Rather, nitrifying bacteria, such as *Nitrosomonas* and *Nitrobacter*, will readily convert ammonia to nitrate in the aerobic conditions of second chamber 2.

Second chamber 2 is preferably provided with a dividing wall 40 that depends from above fluid level L down to a point proximate but not touching bottom 6. The discharge from first pipe 5 and the outflow from second chamber 2 to third chamber 3 (discussed below) are on different sides of dividing wall 40. Thus, for fluid to travel downstream from second chamber 2, it must pass under dividing wall 40. This will keep most of the solids that make it to second chamber 2 on the upstream side of dividing wall 40. Additionally, diffuser 9 is also preferably positioned on the upstream side of dividing wall 40. Dividing wall 40 will largely separate a portion of second chamber from the turbulence generated by diffuser. As a result, the portion of second chamber 2 downstream of dividing wall 40 will be relatively quiescent. This quiescence will help the solids that make it downstream of dividing wall 40 to settle out before passing from second chamber 2 to third chamber 3.

Most of the water treatment will be complete when the water is ready to leave second chamber 2. BOD levels will have been reduced in both first and second chambers 1, 2 and organic nitrogen will have been converted to nitrate, mainly sequentially, in first and second chambers 1, 2.

Third chamber 3 is fluidly connected to second chamber 2. A second pipe 11 is provided between second chamber 2 and third chamber 3. Second pipe 11 has a mouth 11A that is preferably positioned below fluid level L but above bottom 6. This serves the same purpose as the position of mouth 5A of first pipe 5: any solids floating in second chamber 2 will be unable to enter third chamber 3. However, unlike first pipe 5, second pipe 11 is positioned at fluid level L. The position of second pipe 11 controls the height of level L. As the water level in first and second chambers 1, 2 exceeds level L, water will flow into third chamber 3 via gravity. Flow into third chamber 3 will cease when level L reaches the bottom of second pipe 11.

Third chamber 3 is substantially quiescent. As a result, any solids suspended in the water column will have an opportunity to settle out. The water in third chamber 3 should be clear and relatively high quality. However, it will contain a substantial number of bacteria. These bacteria will largely be in a dormant state. Conditions in third chamber 3 will be anaerobic, so any aerobes will die or enter a dormant state. Although oxygen conditions will be favorable to anaerobes, there will be very little carbon available in third chamber 3. The lack of a carbon source will cause the anaerobes, as well, to die or enter a dormant state.

Although the bacteria in third chamber 3 are largely dormant, they can create problems in the effluent. Bacteria can build up in effluent lines 12 in the form of slime, which can clog effluent line 12. Bacteria can form mats in effluent lines 12 and in the discharge field, again leading to blockages of effluent lines 12. Some bacteria are pathogenic, and their discharge into surface waterways and ground water is problematic. Likewise, the presence of pathogens is a health concern if the wastewater is intended to be reused for irrigation, especially if the plants being irrigated are crops or gardens.

In the preferred embodiment, a bactericide is introduced into third chamber 3 in order to kill the bacteria in the wastewater. A variety of commercially available bactericides may be used. However, the preferred bactericide is liquid chlorine.

In the preferred embodiment, an effluent pump 13 is provided. Effluent pump 13 is positioned in third chamber 3. Effluent pump 13 is preferably positioned at least four inches above bottom 6. This will help prevent any solids that settle out in third chamber 3 from being picked up and discharged by effluent pump 13.

Effluent pump 13 is fluidly connected to effluent line 12. Effluent pump 13 may be connected to a timer configured to cause effluent pump 13 to discharge a predetermined amount of treated effluent at regular intervals.

Third chamber also has a level, L'. Level L' will vary, but should be lower than level L. In the preferred embodiment level L' will always be at least about one foot above bottom 6. A sensor 15 is preferably provided in third chamber 3 which will detect if level L' falls below the desired minimum depth. If this occurs, sensor 15 will send a signal to cause effluent pump 13 to be turned off until fluid level L' rises above the desired level. The preferred sensor 15 is a float switch configured to move from the off position to the on position if level L' falls below the desired minimum depth.

Tank 10 is preferably provided with a plurality of sensors 16 designed to detect high water levels as well. Sensors 16 are preferably high water float switches. A high water float switch may be provided in first or second chamber 1, 2. A single sensor 16 should be able to detect excessive fluid levels in both first and second chambers 1, 2 given that they are intended to have a common water level, but a sensor 16 may be provided in each chamber 1, 2 in order to detect water level excesses that may result from a clog within tank 10.

A separate sensor 16 should be provided in third chamber 3, as third chamber 3 is intended to have a different water level than first and second chamber 1, 2. Again, a high water float switch is the preferred sensor. High water float switches are configured to move from the off position to the on position if the water level reaches sensor 16. Movement of any high water float switches to the on position will typically trigger an alarm to alert the owner and/or operator that the water level within tank 10 is inappropriately high.

Sensors 15, 16 may be used to regulate water level L'. In this configuration, sensors 15, 16 are also preferably float switches. When level L' reaches an upper sensor 16, a signal is sent to effluent pump 13, causing it to begin pumping. Effluent pump 13 will continue to run until level L' reaches a lower sensor 15, at which a signal is sent to effluent pump 13, causing it to cease pumping. By properly spacing sensors 15, 16 according to the volume of third chamber 3 and the number of gallons per day tank 10 is configured to treat, the desired delay between cycles of effluent pump 13 may be obtained.

A bactericide pump 17 is also preferably provided in third chamber 3. Bactericide pump 17 is configured to provide predetermined batch doses of bactericide to the fluid in third chamber 3. The operation of bactericide pump 17 and effluent pump 13 are preferably coordinated so that bactericide pump 17 will discharge bactericide into third chamber 3 immediately after effluent pump 13 runs. There should be sufficient time between when bactericide pump 17 runs and when effluent pump 13 runs to give the bactericide adequate contact time with the bacteria to ensure substantially complete toxicity to the microbes in third chamber 3. When chlorine is the bactericide used, sufficient chlorine should be added to third chamber 3 to achieve concentrations of at least about 15 ppm. Bactericide should preferably be added to third chamber 3 at least about 120 minutes before the operation of effluent pump 13.

In the preferred embodiment, bactericide pump 17 is fluidly connected to a bactericide reservoir 18. Reservoir 18 may be provided with a sensor or gauge which monitors the amount of bactericide remaining. The sensor may be configured to provide an alert to the homeowner or other service personnel when reservoir 18 needs to be refilled.

Bactericide pump 17 comprises a pump chamber 19 which is preferably cylindrical. Pump chamber 19 is provided with an inflow aperture 20 fluidly connected to bactericide reservoir 18. Pump chamber 19 is also provided with an outflow aperture 21 fluidly connected to third chamber 3. Outflow aperture 21 should preferably be positioned and configured to completely drain pump chamber 19 when outflow aperture 21 is open.

In the preferred embodiment, bactericide pump 17 is provided with a piston 22 positioned within pump chamber 19. Piston 22 preferably has two opposing heads 23, 24 and a shaft 25 connecting the two. Heads 23, 24 are sized and configured to seal against the interior walls 26 of pump chamber 19.

Piston 22 has a closed position 27 and an open position 28. In closed position 27, second head 24 will close outflow aperture 21. However, shaft 25 should be longer than the distance between outflow aperture 21 and inflow aperture 20. Thus, when second head 24 is positioned over outflow aperture 21, closing the same, first head 23 will be positioned beyond inflow aperture 20 such that inflow aperture 20 is positioned between first head 23 and second head 24. Bactericide can flow into pump chamber 19 from bactericide reservoir 18 when piston 22 is in closed position 27, and the bactericide will be retained between first head 23 and second head 24.

When piston 22 is moved into open position 28, second head 24 will no longer close outflow aperture 21 and outflow aperture 21 will be positioned between first head 23 and second head 24. This will allow the bactericide contained in pump chamber 19 to drain into third chamber 3 of tank 10.

Shaft 25 should also preferably be sized to position first head 23 over inflow aperture 20 when piston 22 is in open position 28. This will seal inflow aperture 20 to bactericide reservoir 18, preventing additional bactericide from entering pump chamber 19 while piston 22 is in open position 28.

It will be appreciated that when piston 22 is in open position 28 in the preferred embodiment, the volume between heads 23, 24 in pump chamber 19 will fill with bactericide. It will be further appreciated that when piston 22 is in closed position 27 in the preferred embodiment, the bactericide in pump chamber 19 will drain into third chamber 3, but no additional bactericide will enter pump chamber 19. In this manner, pump 17 may be used to introduce specific, predetermined volumes of bactericide into third chamber 3. In particular, the volume of the space defined by first head 23, second head 24, and walls 26 of pump chamber 19, less the volume occupied by shaft 25, will be the volume of bactericide introduced to third chamber 3 each time piston 22 cycles into open position 28. By properly sizing the components of bactericide pump 17, pump 17 can be configured to contain and deliver a pre-selected volume of bactericide to third chamber 3 each time pump 17 is activated. In a preferred embodiment, in operation pump chamber 19 will hold about 6 to 8 ounces of bactericide.

Piston 22 is configured to move between closed position 27 and open position 28. Movement between the two positions may be achieved with a variety of mechanisms. One mechanism is to bias piston 22 into one of the two positions 27, 28 with a spring 29. Spring 29 would be overpowered at discrete intervals to move piston 22 into the other position 27, 28.

One device suitable for overpowering spring 29 would be an electric solenoid configured to operate in concert with effluent pump 13—either simultaneously with effluent pump 13 or at a predetermined time relative to the operation of pump 13.

Another option is to use effluent pump 13 to overpower spring 29. In this embodiment, effluent line 12 is fluidly connected to bactericide pump 17. In the preferred embodiment, a pressure aperture 40 is provided in one end 42 of pump chamber 19. Pressure line 41 fluidly connects pump chamber 19 and aperture 40 to effluent line 12. Pressure aperture 40 should be positioned opposite spring 29 relative to piston 22. When effluent pump 13 is on, pressure line 41 will pressurize one side of piston 22. This will overpower spring 29 and cause piston 22 to change positions 27, 28.

In the preferred embodiment, spring 29 biases piston 22 into open position 28. This is the position piston 22 will occupy when effluent pump 13 is off. When effluent pump 13 switches on, piston 22 will move into closed position 27. When effluent pump 13 switches back off, piston 22 will return to open position 28. In operation, this means that when effluent pump 13 turns on, bactericide pump 17 will be in closed position 27, which will allow bactericide pump 17 to fill with the desired amount of bactericide. When effluent pump 13 turns off, bactericide pump 17 will move to open position 28, which will allow the bactericide contained in pump 17 to discharge into third chamber 3 and prevent additional bactericide from entering bactericide pump 17 until effluent pump 13 turns on again. It will be appreciated that this configuration allows bactericide to enter third chamber 3 immediately after operation of effluent pump 17, thereby maximizing the amount of time bactericide spends in contact with microbes in third chamber 3 before those microbes are discharged from tank 10. This is accomplished without any additional electrical controls or sensors.

Tank 10 will preferably be provided with an electrical control panel 30 which will govern the various components of tank 10. Panel 30 will govern when and how long aerator 7 runs and when and how long effluent pump 13 runs. When a solenoid is used to drive piston 22, panel 30 will govern when to move piston 22 from closed position 27 to open position 28 and back. Where effluent pump 13 is used to drive pump 17, no additional input from panel 30 is necessary to govern movement of piston 22.

Panel 30 can also be configured to respond to signals from float switches 15, 16. Panel 30 may be provided with a circuit board and a central processor configured to facilitate the foregoing tasks. Many of the moving components in tank 10 will be electrically powered. Because of this, panel 30 can conveniently communicate with and control these components via the wires that power the various components. However, panel 30 could also communicate with and control the components of tank 10 wirelessly, such as by RF controls, if suitable for a particular application.

It will be appreciated that in a preferred embodiment of tank 10, the principle electrical components are aerator 7 and effluent pump 13. Aerator 7 may run, repeatedly, on a timer. The timer may be directly connected to aerator 7, such that it requires no additional input from control panel 30 to turn aerator 7 on and off. By utilizing sensors 15, 16 to open and close circuits in panel 30, the need for any processor in panel 30 may be eliminated. In this embodiment, the circuit powering effluent pump 13 will simply be completed when upper sensor 16 is triggered by level L' and opened when level L' falls below sensor 15. This will allow the components of tank 1 to be controlled mechanically, without the need for a processor.

In operation, wastewater will flow into first chamber 1 via inflow line 4. Primarily anaerobic treatment will occur in first chamber 1. From first chamber 1, wastewater will flow into second chamber 2. Second chamber 2 is aerated, and primarily aerobic treatment will occur there. Substantially fully treated wastewater will flow from second chamber 2 to third chamber 3. Third chamber 3 is substantially quiescent and anaerobic. Any remaining solids will settle out in third chamber 3. A bactericide pump 17 is configured to introduce batch doses of bactericide in the desired volume to third chamber 3 at set intervals. Thus, two tasks occur in third chamber 3: settling and biocidal treatment, though it will be appreciated that these tasks could be performed in separate chambers. After sufficient delay following introduction of the bactericide to allow for substantially complete toxicity to the bacteria in third chamber 3, effluent is pumped out of tank by an effluent pump 13 via an effluent line 12. Treated wastewater may be returned to ground water, surface waters, or reused for irrigation or the like according to local regulations and user objectives.

These and other improvements to a residential wastewater treatment system will be apparent to those of skill in the art from the foregoing disclosure and drawings and are intended to be encompassed by the scope and spirit of the following claims.

I claim:

1. A multi-chamber wastewater treatment tank comprising:
   an inflow line configured to deliver wastewater to said treatment tank;
   an anaerobic chamber fluidly connected to said inflow line and to an aerobic chamber;
   a settling chamber configured to receive outflow from said anaerobic and aerobic chambers;
   an effluent pump configured to draw effluent from said settling chamber and to discharge said effluent through an effluent line;
   a bactericide reservoir; and
   a bactericide pump powered by said effluent pump and fluidly connected to said reservoir, said bactericide pump configured to receive a predetermined volume of bactericide from said reservoir and introduce said predetermined volume of bactericide to said settling chamber at predetermined intervals, wherein said bactericide pump comprises:
   a pump chamber having interior walls and an inflow aperture fluidly connected to said bactericide reservoir and an outflow aperture fluidly connected to said settling chamber;
   a piston positioned within said pump chamber, said piston having opposing heads and a shaft extending between said heads, wherein said heads are sized and configured to create a substantially fluid tight seal with said interior walls of said pump chamber;
   said piston having a closed position and an open position, wherein in said closed position said inflow aperture will be positioned between said heads of said piston and said outflow aperture will be blocked by one of said heads and wherein in said open position, said outflow aperture will be positioned between said heads of said piston and said inflow aperture will be closed by one of said heads; and
   wherein said piston is configured to move between said closed position and said open position.

2. A multi-chamber wastewater treatment tank according to claim 1 wherein said piston is biased into one of said open position and said closed position.

3. A multi-chamber wastewater treatment tank according to claim 2 wherein said piston is biased with a spring.

4. A multi-chamber wastewater treatment tank according to claim 2 wherein said pump chamber is fluidly connected to said effluent pump, whereby activation of said effluent pump will pressurize a portion of said pump chamber.

5. A multi-chamber wastewater treatment tank according to claim 4 wherein said pressurized portion of said pump chamber is positioned adjacent said piston whereby operation of said effluent pump will apply pressure to said piston in a direction opposite the position into which said piston is biased.

6. A multi-chamber wastewater treatment tank according to claim 5 wherein operation of said effluent pump will move said piston out of the one of said open position and said closed position into which said piston is biased and into the other of said open position and said closed position.

7. A multi-chamber wastewater treatment tank according to claim 6 wherein cessation of operation of said effluent pump will return piston to the one of said open position and said closed position into which said piston is biased.

8. A multi-chamber wastewater treatment tank according to claim 7 further comprising a control panel configured to turn said effluent pump on and off for predetermined intervals.

9. A multi-chamber wastewater treatment tank according to claim 8 wherein said settling chamber has a fluid level and a minimum desired fluid level and wherein said tank is provided with a sensor configured to determine whether said fluid level is below said minimum desired fluid level.

10. A multi-chamber wastewater treatment tank according to claim 9 wherein said sensor is in operative communication with said control panel and wherein said control panel is configured to prevent operation of said effluent pump and said bactericide pump as long as said sensor indicates said fluid level in said settling chamber is below said minimum desired level.

11. A multi-chamber wastewater treatment tank according to claim 1 wherein said outflow aperture is positioned and configured to completely drain said pump chamber when said piston is in said open position.

12. A multi-chamber wastewater treatment tank according to claim 1 wherein said bactericide pump is positioned gravitationally below said bactericide reservoir.

13. A multi-chamber wastewater treatment tank according to claim 1 wherein said bactericide is liquid chlorine.

14. A multi-chamber wastewater treatment tank comprising:
   an inflow line configured to deliver wastewater to said treatment tank;
   at least one treatment chamber configured for bacterial treatment of wastewater;
   a biocidal chamber configured to receive outflow from said at least one treatment chamber;
   an effluent pump configured to draw effluent from said wastewater treatment tank and to discharge said effluent through an effluent line;
   a bactericide reservoir; and
   a bactericide pump powered by said effluent pump and fluidly connected to said reservoir, said bactericide pump configured to receive a predetermined volume of bactericide from said reservoir and introduce said predetermined volume of bactericide to said biocidal chamber at predetermined intervals, wherein said bactericide pump comprises:
   a pump chamber having interior walls and an inflow aperture fluidly connected to said bactericide reservoir and an outflow aperture fluidly connected to said biocidal chamber;
   a piston positioned within said pump chamber, said piston having opposing heads and a shaft extending between said heads, wherein said heads are sized and configured to create a substantially fluid tight seal with said interior walls of said pump chamber;
   said piston having a closed position and an open position, wherein in said closed position said inflow aperture will be positioned between said heads of said piston and said outflow aperture will be blocked by one of said heads and wherein in said open position, said outflow aperture will be positioned between said heads of said piston and said inflow aperture will be closed by one of said heads; and
   wherein said piston is configured to move between said closed position and said open position.

15. A multi-chamber wastewater treatment tank according to claim 14 wherein said piston is biased into one of said open position and said closed position.

16. A multi-chamber wastewater treatment tank according to claim 15 wherein said piston is biased with a spring.

17. A multi-chamber wastewater treatment tank according to claim 15 wherein said pump chamber is fluidly connected to said effluent pump, whereby activation of said effluent pump will pressurize a portion of said pump chamber.

18. A multi-chamber wastewater treatment tank according to claim 17 wherein said pressurized portion of said pump chamber is positioned adjacent said piston whereby operation of said effluent pump will apply pressure to said piston in a direction opposite the position into which said piston is biased.

19. A multi-chamber wastewater treatment tank according to claim 18 wherein operation of said effluent pump will move said piston out of the one of said open position and said closed position into which said piston is biased and into the other of said open position and said closed position.

20. A multi-chamber wastewater treatment tank according to claim 19 wherein cessation of operation of said effluent pump will return said piston to the one of said open position and said closed position into which said piston is biased.

21. A multi-chamber wastewater treatment tank according to claim 20 further comprising a control panel configured to turn said effluent pump on and off for predetermined intervals.

22. A multi-chamber wastewater treatment tank according to claim 21 wherein said biocidal chamber further comprises a settling chamber.

23. A multi-chamber wastewater treatment tank according to claim 22 wherein said settling chamber has a fluid level and a minimum desired fluid level and wherein said tank is provided with a sensor configured to determine whether said fluid level is below said minimum desired fluid level.

24. A multi-chamber wastewater treatment tank according to claim 23 wherein said sensor is in operative communication with said control panel and wherein said control panel is configured to prevent operation of said effluent pump and said bactericide pump as long as said sensor indicates said fluid level in said settling chamber is below said minimum desired level.

25. A multi-chamber wastewater treatment tank according to claim 24 wherein said effluent pump is configured to draw effluent from said settling tank.

26. A multi-chamber wastewater treatment tank according to claim 14 wherein said outflow aperture is positioned and configured to completely drain said pump chamber when said piston is in said open position.

27. A multi-chamber wastewater treatment tank according to claim 14 wherein said bactericide pump is positioned gravitationally below said bactericide reservoir.

28. A multi-chamber wastewater treatment tank according to claim 14 wherein said bactericide is liquid chlorine.

29. A multi-chamber wastewater treatment tank according to claim 14 wherein said treatment chamber is substantially anaerobic.

30. A multi-chamber wastewater treatment tank according to claim 14 wherein said treatment chamber is aerated.

* * * * *